United States Patent
Fu et al.

(10) Patent No.: US 7,574,139 B2
(45) Date of Patent: Aug. 11, 2009

(54) CARRIER-SUPPRESSED OPTICAL TIME DOMAIN MULTIPLEXING

(75) Inventors: Xiaoli Fu, Nepean (CA); Genzao Zhang, Ottawa (CA); Feng Shi, Kanata (CA); Tongqing Wang, Los Altos, CA (US); Jinghui Li, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 1327 days.

(21) Appl. No.: 10/157,900

(22) Filed: May 31, 2002

(65) Prior Publication Data
US 2003/0223462 A1    Dec. 4, 2003

(51) Int. Cl.
*H04J 14/08* (2006.01)
(52) U.S. Cl. .............................. 398/98; 398/75; 398/99
(58) Field of Classification Search ................. 398/182, 398/195, 192, 188, 67, 68, 204, 74, 75, 98–103
See application file for complete search history.

(56) References Cited

U.S. PATENT DOCUMENTS

| | | | | |
|---|---|---|---|---|
| 5,781,327 | A | | 7/1998 | Brock et al. ................ 359/249 |
| 6,763,197 | B1 | * | 7/2004 | Hirano et al. ............... 398/192 |
| 2003/0058499 | A1 | * | 3/2003 | Reingand et al. ........... 359/135 |
| 2006/0093377 | A1 | * | 5/2006 | Choudhary et al. ......... 398/188 |

OTHER PUBLICATIONS

Akihide Sano and Yutaka Miyamoto, *Member, IEEE,* "Performance Evaluation of Prechirped RZ and CS-RZ Formats in High-Speed Transmission Systems With Dispersion Management", Journal of Lightwave Technology, vol. 19, No. 12, Dec. 2001, pp. 1864-1871.
Yanjun Zhu, W.S. Lee, C. Scahill, D. Watley, C. Fludger, P. Bontemps, M. Jones, G. Pettitt, B. Shaw and A. Hadjifotiou, "" 16-channel 40 Gb/s carrier-suppressed RZ ETDM/DWDM transmission over 720 km NDSF without polarisation channel interleaving, pp. ThF4-1-ThF4-4, 2001.

* cited by examiner

*Primary Examiner*—Dzung D Tran
(74) *Attorney, Agent, or Firm*—Fish & Richardson P.C.

(57) ABSTRACT

A method and an apparatus for implementing carrier suppressed data format on conventional OTDM modules is provided. Adaptive phase shifting of optical signals traversing one of the tributaries of an OTDM module is performed with feedback loop control. A tapped portion of the input carrier signal is phase modulated at a frequency $f_c$, and is combined with a tapped portion of the output from the OTDM. A phase shifter controller fed with this combined signal photodetects and band-pass filters the signal around $f_c$ to extract the amplitude of the AC component of the envelope of the combined signal, which depends upon the phase difference between successive pulses of the OTDM output. This signal is used to control a phase shifter coupled along one of the tributaries of the OTDM to adjust the phase difference of the signals of the two tributaries so that carrier suppression results.

24 Claims, 7 Drawing Sheets

CARRIER-SUPPRESSED OPTICAL TIME DOMAIN MULTIPLEXING

FIELD OF THE INVENTION

The invention relates to optical time domain multiplexing and more particularly to phase control of the carrier of an optical time domain multiplexed signal.

BACKGROUND OF THE INVENTION

Optical time domain multiplexing is widely employed in high bit rate transmitter modules and is required for the use of modern components in systems with bit rates of 40 Gbps or higher. With increasing use of high bit rate components, optical systems are depending more and more on optical time domain multiplexing and its associated RZ (return to zero) data format. Improving the qualities of the data stream of high bit rate transmissions in RZ format is desirable and ever increasingly important.

Traditionally, non-carrier suppressed optical signals do not compensate for neighboring pulse interaction, which arises when return to zero format data is simply encoded by a straight amplitude modulation or attenuation of the optical carrier without taking into account the phase of the carrier. Carrier suppression is achieved by ensuring that the phase of the carrier in neighboring RZ pulses differs by $\pi$ (or differs by an odd integer of $\pi$). For all intents and purposes with respect to achieving carrier suppression, a phase difference of $\pi$ and an odd integer of $\pi$ are equivalent, Carrier suppressed RZ data format (often referred to as CS-RZ format) in optical fiber has potential advantages over traditional conventional transmission formats. Such benefits are larger power margins, higher possible input power, and excellent transmission performance under relaxed system conditions; see A. Sano, Y. Miyamoto, "Performance Evaluation of Prechirped RZ and CS-RZ Formats in High-Speed Transmission Systems With Dispersion Management" Journal of Lightwave Technology, vol. 19, No. 12, December 2001, and Yanjun Zhu, W S Lee, C Scahill et al, "16-channel 40Gb/s Carrier-suppressed RZ ETDM/DWDM Transmission over 720 NDSF Without Polarization Channel Interleaving," OFC'2001, ThF4-1, 2001.

Referring to FIG. 1, conventional carrier suppressed modulation is described. An input optical signal being an input carrier pulse array in RZ format propagates along waveguide portion 5. A graph illustrating the array of pulses and their associated intensity, carrier and phase is shown for both the input optical signal and the output optical signal. It should be noted that the illustration represents the carrier at a much lower frequency relatively speaking in comparison with the RZ pulse width than that actually used. High rate optical RZ data format typically is 40 Gb per second or higher, however, typical optical carrier frequencies can be in the range of hundreds to thousands of times that. The input optical signal traversing waveguide portion 5 is made up of RZ pulses which are out of phase by $\pi$ with neighboring pulses. The input optical signal enters an optical attenuator or optical modulator 10 via an input 7. The modulator 10 encodes data into the pulse array by attenuating appropriate pulses of the RZ stream. The output optical signal emerging from an output 8 of the modulator 10 is a carrier suppressed RZ (CS-RZ) data stream. This CS-RZ data stream propagates along a waveguide portion 9 as an output optical signal. The illustration associated with the output optical signal shows the data modulated onto the carrier by variation in the intensity of the RZ pulses, while the phase relationship of the neighboring pulses remains fixed at a difference of $\pi$ between successive pulses, resulting in a CS-RZ stream.

Referring to FIG. 2, the optical signals typically produced by a conventional optical time domain multiplexing (OTDM) module is described. The optical data stream from a conventional OTDM module is not carrier suppressed. The RZ data format commonly used in OTDM implementations normally has no built in requirement for the phases of neighboring pulses to have any relationship. In fact, due to the nature of typical OTDM pulse multiplexing, the phase relationship between successive pulses is unknown and constantly changing due to changing environmental condition for example variations in temperature.

The conventional OTDM module has a input waveguide portion 15 over which an input optical signal made up of RZ pulses in a pulse arrays propagates. FIG. 2 shows an illustration of a typical RZ pulse array for the input signal. Each RZ pulse is separated in time by the absence of any signal for a duration at least equal to the duration of each pulse. The carrier of the input is also depicted in the illustration. For the purposes of discussion the pulse period of the input pulse array is $\Delta t$. The optical pulses are split by an optical splitter 17 which is set to split the power of the optical signals over two tributaries, an upper tributary, tributary A 50 and a lower tributary, tributary B 60, so that the optical signals may be separately modulated. Signals set to traverse tributary A 50, propagate over a waveguide portion 18 to an input 21 of an optical attenuator or optical modulator 20. The optical modulator 20 encodes data into the pulse stream by attenuating pulses. A modulated optical signal emerges from an output 22 of the optical modulator 20, and traverses waveguide portion 25 to enter through an input 31 of an optical delay element 30. The optical delay element 30 is a longer path or optical waveguide portion through which the optical signals must propagate in comparison with that of the lower tributary, namely tributary B 60. The modulated and delayed optical signal emerges from an output 32 of the optical delay 30 to traverse an optical waveguide portion 35. Signals set to traverse tributary B 60, propagate over a waveguide portion 19 to an input 71 of an optical attenuator or optical modulator 70. The optical modulator 70 encodes data into the pulse stream by attenuating pulses. A modulated optical signal emerges from an output 72 of the optical modulator 70, and traverses waveguide portion 75. The optical signals are such that once they are combined at an optical combiner 40, the attenuated pulses from each tributary will interleave one another in time (time domain multiplexing). Such a condition is met when, if the period of the input pulse array is $\Delta t$, the delay caused by the optical delay element to the optical signal traversing tributary A 50 causes a time delay difference of $\Delta t/2$ or an odd multiple thereof. FIG. 2 depicts this offset by way of an illustration of the pulses of each tributary just before the optical signals are combined. The optical signals traversing tributary A 50 and tributary B 60 are combined by the optical combiner 40 and emerge along a waveguide portion 45 connected to the output of the combiner 40 as a resulting time domain multiplexed signal. The intensity carrier signal and phase of this output is illustrated in FIG. 2. It should be noted that the phase difference between successive RZ pulses is x.

The resulting optical signal is not CS-RZ format. Suppose the phase of pulses in the input pulse array is that of a continuous sinusoid. The phase difference between the adjacent pulses at the output of the combiner is determined by the fine optical path difference between the two tributaries. Only if the optical path difference coincidentally is exactly is some odd multiple of $\lambda/2$ would the phase difference of adjacent RZ pulses be equal to π. As described above, the carrier period in time is much smaller than the bit period of the modulated signal, in fact the carrier period is on the order of about $5 \cdot 10^{-15}$ seconds. In conventional OTDM modules, it is very difficult to produce an optical path difference between two tributaries which is precisely some odd number of λ/2. The optical path difference also varies with time due to for example periodic variations in temperature or temperature gradients across the module. The carrier phase difference between adjacent pulses is random and for practical purposes is unknown and unpredictable.

Given the known benefits of carrier suppressed data formats, it would be desirable for there to be a method and an apparatus which provides optical time domain multiplexing which produces optical data signals in a carrier suppressed RZ data format.

SUMMARY OF THE INVENTION

The present invention provides a technique to implement carrier suppressed data format on OTDM modules. The technique involves adaptive phase shifting of optical signals traversing one of the tributaries of an OTDM module in conjunction with feedback loop control. A tapped portion of the carrier is phase modulated and added to a tapped portion of the output of the OTDM. The resulting combined signal is photodetected and filtered centered at the phase modulation frequency to extract the amplitude of the AC component of the envelope of the combined signal. This amplitude is a function of the phase difference between signals in successive pulses of the OTDM output, and is used to adjust the phase shift given one of the signals traversing the OTDM to create a carrier suppressed output signal.

According to a first broad aspect, the invention provides for an apparatus for providing carrier suppression for the optical output of an optical time domain multiplexing (OTDM) module, the OTDM module having a tributary, the apparatus including a carrier phase shifter for shifting the phase of a carrier of an optical signal traversing the tributary of the OTDM module, and a feedback loop apparatus for controlling the carrier phase shifter, the feedback loop apparatus controlling a magnitude of the shifting of the phase of the carrier of the optical signal as a function of the optical output to achieve a phase difference of π between successive pulses of the optical output.

According to a second broad aspect, the invention provides for an apparatus for providing carrier suppression for the optical output of an optical time domain multiplexing (OTDM) module, the OTDM module having a tributary, the apparatus including a carrier phase shifter for shifting the phase of a carrier of an optical signal traversing the tributary of the OTDM module, and a feedback loop apparatus for controlling the carrier phase shifter, the feedback loop apparatus detecting a phase modulated portion of an original non-pulsed version of the carrier and a portion of the optical output, generating an electrical combined signal which corresponds to an envelope of the sum of the phase modulated portion of the original non-pulsed version of the carrier and the portion of the optical output, extracting an amplitude of an AC component of the electrical combined signal, and controlling a magnitude of the shifting of the phase of the carrier of the optical signal as a function of the amplitude to achieve a phase difference of π between successive pulses of the optical output.

In some embodiments of the invention, the feedback loop includes a first optical power tap for tapping an original non-pulsed version of the carrier generating the portion of an original non-pulsed version of the carrier, a phase modulator for modulating a phase of the portion of the original non-pulsed version of the carrier at a frequency $f_c$ generating a phase modulated portion of the original non-pulsed version of the carrier, a second optical power tap for tapping the optical output generating the portion of the optical output, a detector for detecting the phase) modulated portion of the original non-pulsed version of the carrier and the portion of the optical output, generating an electrical combined signal, the electrical combined signal being the mean intensity of a sum of the phase modulated portion of the original non-pulsed version of the carrier and the portion of the optical output, and a phase shifter controller for extracting the amplitude of the AC component of the electrical combined signal, and controlling the magnitude of said shifting of the phase of the carrier of the optical signal as a function of the amplitude.

In some embodiments of the invention, the phase shifter controller includes a band-pass block having a band-pass filter centered at frequency $f_c$ for extracting the amplitude of the AC component of the electrical combined signal, and a control signal calculator for generating from the amplitude a control step size at an update rate for use in controlling the magnitude of the shifting of the phase of the carrier of the optical signal.

In some embodiments of the invention, the phase shifter controller further includes an A/D converter for converting the electrical combined signal from the detector into a digital signal for use by the band-pass block, and a phase shifter driver for controlling the magnitude of the shifting of the phase of the carrier of the optical signal at the update rate as a function of the control step size generated by the control signal calculator, in which the band-pass block includes a low-pass filter for filtering out short term noise from the electrical combined signal.

Some embodiments of the invention provide for a modulation clock for clocking the phase modulator with a sinusoidal clock signal, in which the phase modulator modulates the phase of the portion of the original non-pulsed version of the carrier sinusoidally with a modulation phase range of at least π.

In some embodiments of the invention, the detector is a photodiode.

In some embodiments of the invention, the detector includes an optical combiner for combining the phase modulated portion of the original non-pulsed version of the carrier and the portion of the optical output, generating a combined optical signal, and a photodiode for detecting the phase modulated portion of the original non-pulsed version of the carrier and the portion of the optical output of the combined optical signal, and for generating the electrical combined signal.

In some embodiments of the invention, in which the amplitude of the AC component of the electrical combined signal varies as a sinusoidal function of the phase of the carrier of the optical signal, the sinusoidal function having a maximum, the control signal calculator generates the control step size from the amplitude of the AC component of the electrical combined signal according to the following: if the absolute value of the amplitude is less than a threshold amplitude or if the absolute value of the amplitude divided by the maximum is less than a control resolution, the control step size is zero, otherwise if the absolute value of the amplitude divided by the maximum is less than the absolute value of a previous amplitude divided by the maximum or if the sign of the amplitude is different from the sign of the previous amplitude, the control step size is one half the amplitude divided by the product of the maximum and the control resolution, and otherwise the control step size is the amplitude divided by the product of the maximum and the control resolution, in which the phase shifter driver determines that the magnitude of the shifting of the phase of the carrier of the optical signal is equal to the product of the control step size and the control resolution.

In some embodiments of the invention the band-pass filter block includes a plurality of low-pass filters for multi-length low-pass filtering.

In some embodiments of the invention, the OTDM module is implemented on a Lithium Niobate chip wherein the first optical power tap is a 2% external power tap, the second optical power tap is a 5% on chip power tap, the carrier phase shifter is an on chip Lithium Niobate phase modulator, the phase modulator is an on chip Lithium Niobate phase modulator, the optical combiner is an on chip combiner, the photodiode is an external PIN detector, the phase shifter controller is an external controller, and the band-pass filter is a digital electrical finite impulse response filter.

According to a third broad aspect, the invention provides for a method of providing carrier suppression for the optical output of an optical time domain multiplexing (OTDM) module, the OTDM module having a tributary, the method including, shifting the phase of a carrier of an optical signal traversing a tributary of the OTDM module, and controlling a magnitude of the shifting of the phase of the carrier of the optical signal as a function of the optical output to achieve a phase difference of $\pi$ between successive pulses of the optical output.

According to a fourth broad aspect, the invention provides for a method of providing carrier suppression for the optical output of an optical time domain multiplexing (OTDM) module, the OTDM module having a tributary, the method including, shifting the phase of a carrier of an optical signal traversing a tributary of the OTDM module, detecting a phase modulated portion of an original non-pulsed version of the carrier and a portion of the optical output, generating an electrical combined signal which corresponds to an envelope of the sum of the phase modulated portion of the original non-pulsed version of the carrier and the portion of the optical output, extracting an amplitude of an AC component of the electrical combined signal, and controlling a magnitude of the shifting of the phase of the carrier of the optical signal as a function of the amplitude to achieve a phase difference of $\pi$ between successive pulses of the optical output.

Some embodiments of the invention provide for tapping an original non-pulsed version of the carrier generating the portion of an original non-pulsed version of the carrier, modulating a phase of the portion of the original non-pulsed version of the carrier at a frequency $f_c$ generating a phase modulated portion of the original non-pulsed version of the carrier, and tapping a portion of the optical output generating the portion of the optical output, in which the electrical combined signal is the mean intensity of a sum of the phase modulated portion of the original non-pulsed version of the carrier and the portion of the optical output.

In some embodiments of the invention the extracting the amplitude of the AC component of the electrical combined signal includes band-pass filtering centered at frequency $f_c$, and the controlling the magnitude of said shifting of the phase of the carrier of the optical signal further includes generating from the amplitude a control step size at an update rate.

In some embodiments of the invention the extracting the amplitude of the AC component of the electrical combined signal further includes converting the electrical combined signal into a digital signal for use in band-pass filtering, low-pass filtering for filtering out short term noise from the electrical combined signal, and controlling the magnitude of the shifting of the phase of the carrier of the optical signal at the update rate as a function of the control step size.

Some embodiments of the invention provide for controlling the modulating of a phase of the portion of the original non-pulsed version of the carrier by clocking with a sinusoidal clock signal, in which the modulating of a phase of the portion of the original non-pulsed version of the carrier modulates the phase of the portion of the original non-pulsed version of the carrier sinusoidally with a modulation phase range of at least $\pi$.

Some embodiments of the invention provide for combining the phase modulated portion of the original non-pulsed version of the carrier and the portion of the optical output, generating a combined optical signal, and detecting the phase modulated portion of the original non-pulsed version of the carrier and the portion of the optical output of the combined optical signal.

In some embodiments of the invention in which the amplitude of the AC component of the electrical combined signal varies as a sinusoidal function of the phase of the carrier of the optical signal, the sinusoidal function having a maximum, generating from the amplitude a control step size at an update rate includes: if the absolute value of the amplitude is less than a threshold amplitude or if the absolute value of the amplitude divided by the maximum is less than a control resolution, the control step size is zero, otherwise if the absolute value of the amplitude divided by the maximum is less than the absolute value of a previous amplitude divided by the maximum or if the sign of the amplitude is different from the sign of the previous amplitude, the control step size is one half the amplitude divided by the product of the maximum and the control resolution, and otherwise, the control step size is the amplitude divided by the product of the maximum and the control resolution, in which the magnitude of the shifting of the phase of the carrier of the optical signal is determined to be equal to the product of the control step size and the control resolution.

In some embodiments of the invention low-pass filtering includes multi-length low-pass filtering.

In some embodiments of the invention the OTDM module is implemented on a Lithium Niobate chip, in which the tapping of an original non-pulsed version of the carrier is external 2% power tapping, the tapping of the optical output is on chip 5% power tapping, the shifting of the phase of the carrier of the optical signal is on chip Lithium Niobate phase shifting, the modulating of the phase of the portion of the original non-pulsed version of the carrier is on chip Lithium Niobate phase modulating, the combining of the phase modulated portion of the original non-pulsed version of the carrier and the portion of the optical output is on chip combining, the controlling of the magnitude of said shifting of the phase of the carrier of the optical signal as a function of said amplitude is performed externally.

According to a fifth broad aspect, the invention provides for an optical time domain multiplexing (OTDM) module providing carrier suppression for the optical output of the OTDM module, the OTDM module having a tributary, the OTDM module including a carrier phase shifter for shifting the phase of a carrier of an optical signal traversing the tributary of the OTDM module, and a feedback loop apparatus for controlling the carrier phase shifter, the feedback loop apparatus controlling a magnitude of the shifting of the phase of the carrier of the optical signal as a function of the optical output to achieve a phase difference of $\pi$ between successive pulses of the optical output.

According to sixth broad aspect, the invention provides for an optical time domain multiplexing (OTDM) module providing carrier suppression for the optical output of the OTDM module, the OTDM module having a tributary, the OTDM module including a carrier phase shifter for shifting the phase of a carrier of an optical signal traversing a tributary of the OTDM module, and a feedback loop apparatus for controlling the carrier phase shifter, the feedback loop apparatus detecting a phase modulated portion of an original non-pulsed version of the carrier and a portion of the optical output, generating an electrical combined signal which corresponds to an envelope of the sum of the phase modulated portion of the original non-pulsed version of the carrier and the portion of the optical output, extracting an amplitude of an AC component of the electrical combined signal, and controlling a magnitude of said shifting of the phase of the carrier of the optical signal as a function of the amplitude to achieve a phase difference of $\pi$ between successive pulses of the optical output.

According to a seventh broad aspect, the invention provides for a method of providing carrier suppression for the optical output of an optical time domain multiplexing (OTDM) module, the OTDM module having N tributaries, the method including, for N−1 tributaries of the OTDM module, shifting the phases of the carriers of optical signals traversing the N−1 tributaries, detecting a phase modulated portion of an original non-pulsed version of the carrier and a portion of the optical output, generating an electrical combined signal which corresponds to an envelope of the sum of the phase modulated portion of the original non-pulsed version of the carrier and the portion of the optical output, extracting an amplitude of an AC component of the electrical combined signal, and controlling magnitudes of the shifting of the phases of the carriers of optical signals traversing the N−1 tributaries as a function of the amplitude to achieve a phase difference of $\pi$ between successive pulses of the optical output.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 3:
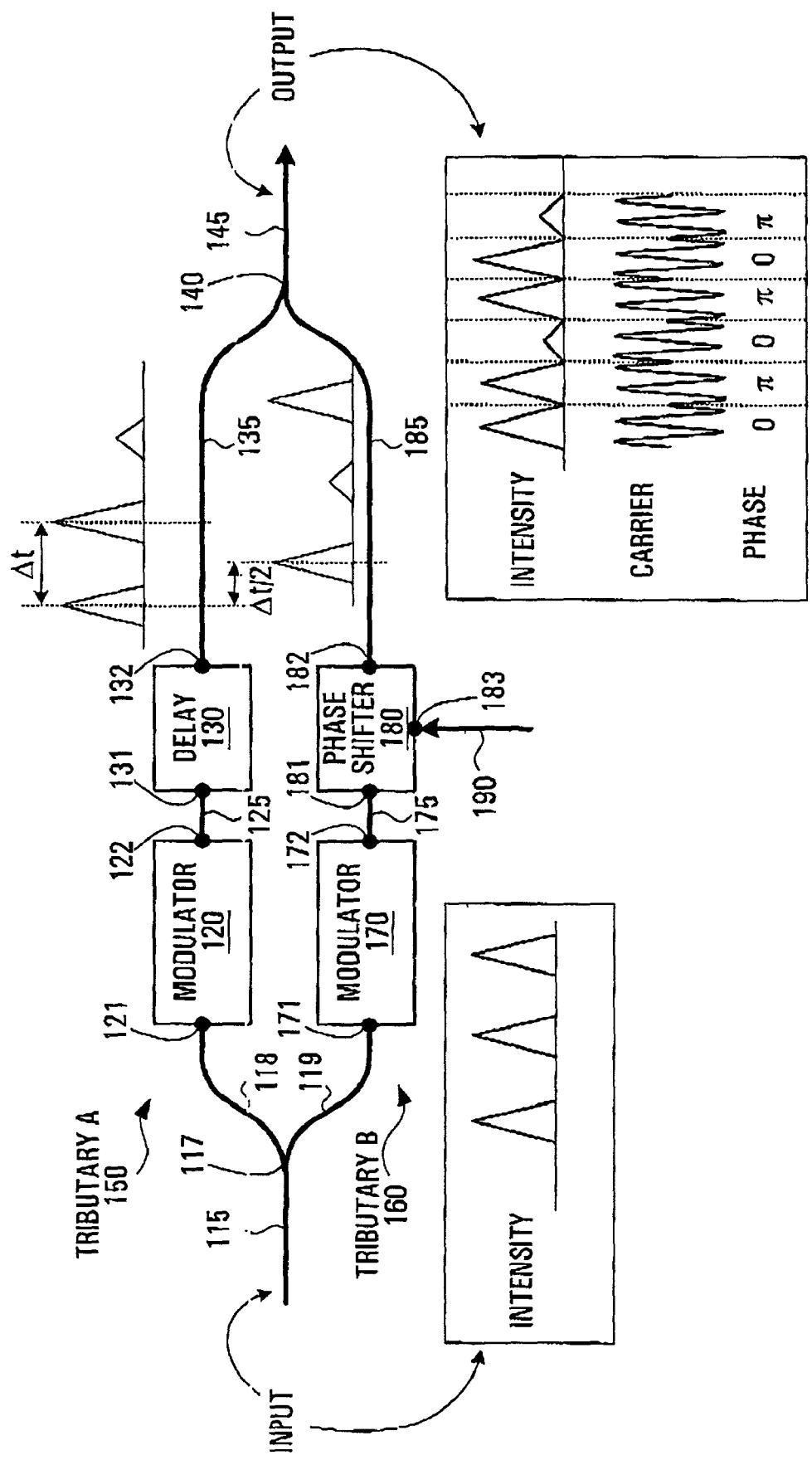
FIG. 3 is a is a functional block diagram of a preferred OTDM module for producing CS-RZ optical format signals constructed according the invention with accompanying optical input and output signal illustrations.

Referring to FIG. 3, an OTDM module for producing CS-RZ optical format signals constructed according the invention is described. The general method of carrier suppressed modulation is implemented on an OTDM module by locking the phase difference of pulses from the two tributaries to $\pi$, by way of adaptive phase shifting.

A preferred embodiment of an apparatus constructed according to the invention is now described in terms of its structure. An input optical signal which is made up of a pulse array propagates along an input waveguide portion 115. The input waveguide portion 115 is coupled to an optical splitter 117 which is set to split optical signals passing therethrough along two outputs in a preferably 50%-50% power ratio. A first output of the optical splitter 117 is coupled to a first upper waveguide portion 118. The first upper waveguide portion 118 is coupled to an input 121 of an upper optical attenuator or upper optical modulator 120. The upper optical attenuator or upper optical modulator 120 is coupled via an output 122 to a second upper waveguide portion 125. The second upper waveguide portion 125 is coupled to an input 131 of an optical delay element 130. The optical delay element 130 could be, for example, simply a longer length optical waveguide portion in comparison with the length of the waveguide portions along a lower tributary, namely tributary B generally indicated by 160. In general, the optical delay element 130 could be any optical component for introducing an optical path difference between signals traversing tributary A 150 and tributary B 160 which possess desired optical characteristics. The optical delay element 130 is connected via its output 132 to a third upper waveguide portion 135. It should be understood that the optical delay element 130 and the upper optical modulator 120 may be reversed along tributary A 150. The third upper waveguide portion 135 is coupled to a first input of an optical combiner 140. Collectively, the first upper waveguide portion 118, the optical modulator 120, the second upper waveguide portion 125, the optical delay element 130 and the third upper waveguide portion 135 make up an upper tributary, namely tributary A, indicated generally by 150.

A second output of the optical splitter 117 is coupled to a first lower waveguide portion 119. The first lower waveguide portion 119 is coupled to an input 171 of a lower optical attenuator or lower optical modulator 170. The lower optical attenuator or lower optical modulator 170 is coupled via an output 172 to a second lower waveguide portion 175. The second lower waveguide portion 175 is coupled to an input 181 of a carrier phase shifter 180 which in general is a tunable phase shifter which may be controllably set. The carrier phase shifter 180 is connected via its output 182 to a third lower waveguide portion 185. It should be understood that the carrier phase shifter 180 and the lower optical modulator 170 may be reversed along tributary B 160. The third lower waveguide portion 185 is coupled to a second input of the optical combiner 140. An output of the optical combiner 140 is coupled to an output waveguide portion 145. Control line or lines 190 are coupled via a control signal input 183 to the tunable optical carrier phase shifter 180. Collectively, the first lower waveguide portion 119, the lower optical modulator 170, the second lower waveguide portion 175, the carrier phase shifter 180 and the third lower waveguide portion 185 make up the lower tributary, namely tributary B, indicated generally by 160.

Figure 1:
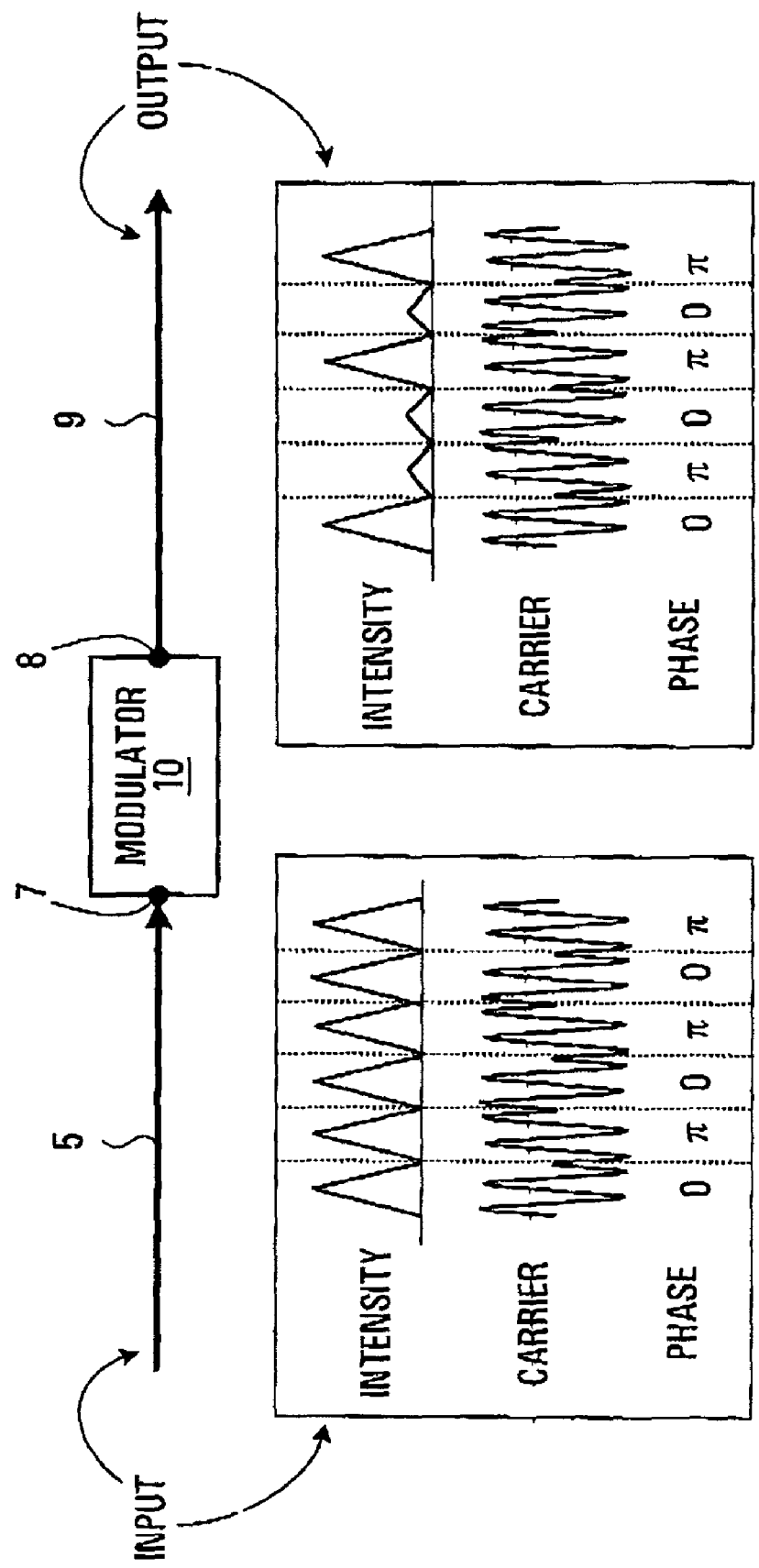
FIG. 1 is a functional block diagram of conventional modulation of carrier suppressed pulses with accompanying optical input and output signal illustrations.
Figure 2:
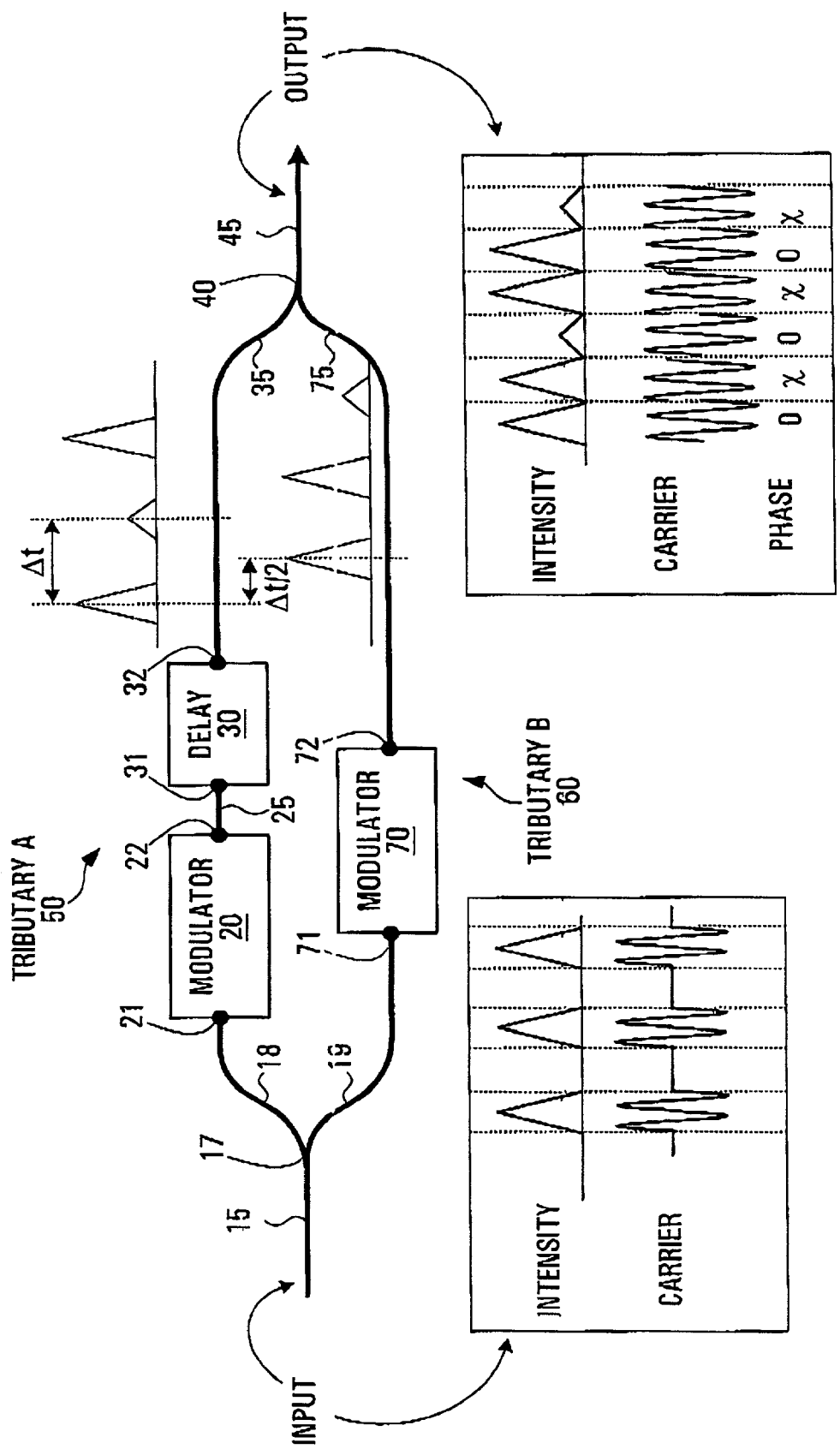
FIG. 2 is a functional block diagram of a conventional OTDM module with accompanying optical input and output signal illustrations.

Referring to FIG. 3, a preferred OTDM module for producing CS-RZ optical format signals constructed according the invention is described in terms of its function. An input optical signal which has the characteristics of the input signal described in association with FIG. 2 propagates along the input optical waveguide portion 115. This optical signal input is shown in FIG. 2 as a series of pulses illustrating the optical signal intensity. The optical input signal enters the optical splitter 117 and is split in a ratio of about 50% -50% between tributary A 150 and tributary B 160. The portion of the optical signal which propagates along tributary A 150, emerges from the first output of the optical splitter 117, traverses the first upper waveguide portion 118 and enters the input 121 of the upper optical modulator 120. The upper optical modulator 120 encodes one of the optical data channels to be time domain multiplexed by attenuation or amplitude modulation of the optical pulses passing therethrough. Modulated optical pulses emerge from the upper optical modulator 120 through the output 122 and traverse the second upper waveguide portion 125. The optical signals then enter via the input 131 the optical delay element 130, where they are delayed by a certain amount of time in order to create an optical path difference between the upper and lower tributaries. As described in association with FIG. 2, this path difference is such that if the period of the input pulse array is $\Delta t$, the delay caused by the optical delay element to the optical signal traversing tributary A 150 causes a time delay difference of $\Delta t/2$ or an odd multiple thereof between signals traversing tributary A 150 and signals traversing tributary B 160. After being delayed, optical signals passing through optical delay element 130, emerge from the optical delay element output 132, traverse the third upper waveguide portion 135, and enter the first input of the optical combiner 140.

The portion of the optical signal which propagates along tributary B 160, emerges from the second output of the optical splitter 117, traverses the first lower waveguide portion 119 and enters the input 171 of the lower optical modulator 170. The lower optical modulator 170 encodes a second optical data channel to be time domain multiplexed by attenuation or amplitude modulation of the optical pulses passing therethrough. Modulated optical pulses emerge from the lower optical modulator 170 through the output 172 and traverse the second lower waveguide portion 175. The optical signals then enter via the input 181 the carrier phase shifter 180. The carrier phase shifter 180 operates to tunably control the phase of the optical carrier passing therethrough, by way of a phase shift, in response to control signal input over the control line or lines 190 through the control signal input 183. The carrier phase shifter 180 is set to cause a phase difference of $\pi$ between pulses traversing the upper and the lower tributary. A preferred embodiment implementing one way in which the phase shifter may be controlled to produce the desired phase shift is described below. The optical signal passing through the carrier phase shifter 180 emerges from the output 182 and traverses the third lower waveguide portion 185 to enter the second input of the combiner 140. The optical signals which have traversed tributary A 150 and have traversed tributary B 160 are combined in combiner 140 emerging as a combined optical time domain multiplexed signal propagating along the output waveguide portion 145. Due to the optical path difference introduced by the optical delay element 130, the pulses which have traversed the upper and lower tributaries are combined to form a proper time domain multiplexed RZ format data stream. Due to the phase shift introduced to the optical signals traversing tributary B 160, namely a phase shift causing a phase difference of $\pi$ between the pulses traversing tributary B 160 and those traversing tributary A 150, the combined optical signal propagating along output waveguide portion 145 is in carrier suppressed RZ data format. Each pulse in the combined optical signal therefore is out of phase with its neighbors by $\pi$.

Figure 4:
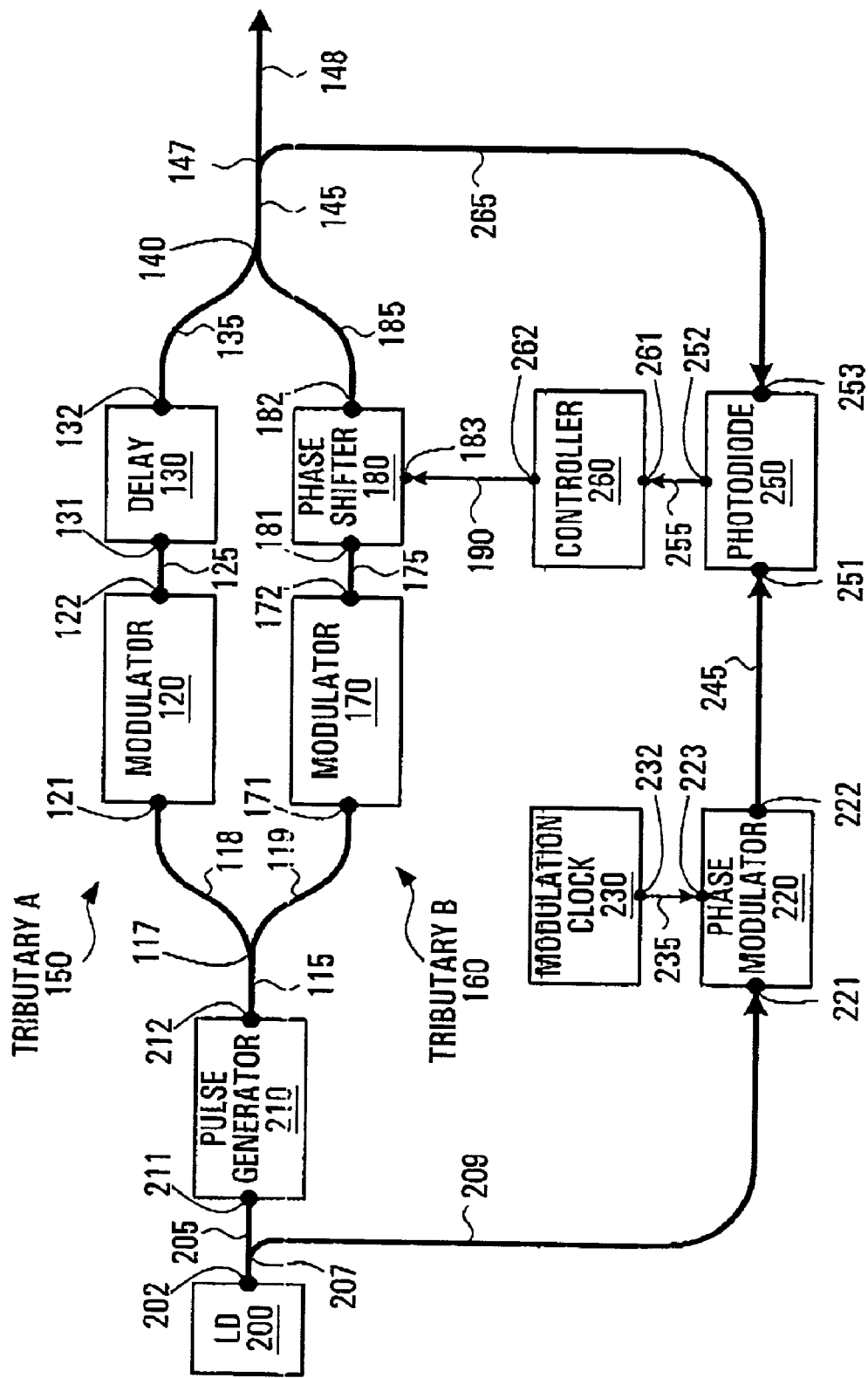
FIG. 4 is a functional block diagram of a preferred OTDM module for producing CS-RZ optical format signals including phase control architecture constructed according the invention.

Referring also now to FIG. 4, an OTDM module for producing CS-RZ optical format signals including phase control architecture constructed according to the invention is described. This embodiment of an OTDM module builds upon that described in association with FIG. 3. The following describes the structure and function of a control architecture to be used in the control of the carrier phase shifter 180.

Turning firstly to structure, a laser diode 200 is coupled by a laser diode output 202 to a first waveguide portion 205. Coupled along the first waveguide portion 205 is a first optical power tap 207, which taps a small amount of optical power (2%-5%) from the optical signals propagating along the first waveguide portion 205. The first waveguide portion 205 is coupled to the input 211 of a pulse generator 210 which is coupled via its output 212 to the input waveguide portion 115 as described in association with FIG. 3. The first optical power tap 207 is coupled via a first power tap waveguide portion 209 to an input 221 of an optical phase modulator 220. A modulation clock 230 set to output a sinusoidal clock frequency of $f_c$ over its output 232 is connected via clock line 235 to a clock input 223 of the optical phase modulator 220. The optical phase modulator is coupled via its output 222 to a post phase modulator waveguide portion 245 which is in turn coupled to a first input 251 of a photodiode 250. The photodiode 250 could also be any suitable photo detector. The output waveguide portion 145 as described in association with FIG. 3, is coupled to a second optical power tap 147 which taps a small amount of optical power (2% -5%) from the optical signals propagating along the output waveguide portion 145. The second optical power tap 147 is coupled via a second power tap waveguide portion 265 to a second input 253 of the photodiode 250. In some embodiments the photodiode 250 may have only one input, in which case the optical signals traversing post phase modulator waveguide portion 245 and the second power tap waveguide portion 265 may be combined into one signal by way of a combiner (not shown in the figure) after which the combined signal is delivered to the photodiode 250. An electrical output 252 of the photodiode 250 is coupled via an electrical line 255 to an input 261 of a phase shifter controller 260. The phase shifter controller 260 is coupled via its control signal output 262 over control line or lines 190 as described in association with FIG. 3 to the carrier phase shifter 180.

The function of a control architecture to be used for controlling the carrier phase shifter 180 will now be described. A continuous laser optical signal emerges from the output 202 of the laser diode 200 and traverses the first waveguide portion 205. The first optical power tap redirects 2%-5% of the power of the optical signal along the first power tap waveguide portion 209. The remaining 95%-98% of the optical signal continues to propagate along the first waveguide portion 205 and is input via an input 211 to a pulse generator 210, which generates from the optical signal an RZ optical signal as that described in association with FIGS. 2 and 3 as the input optical signal therein. This input optical signal pulse array is output through output 212 to traverse the input optical waveguide 115 and tributaries A 150, and B 160 as described in association with FIG. 3.

The optical signal $P_s$ tapped by the first optical power tap 207 propagates along the first power tap waveguide portion 209 to the input 221 of an optical phase modulator 220. It is noted that the optical signal $P_s$ has the following functional form:

$$P_s = a_o \cdot \sin(\omega t)$$

where $a_o$ is the amplitude and $\omega$ is the angular frequency of the optical carrier. The optical phase modulator 220 is driven at a clock frequency of $f_c$ via the clock signals of the modulation clock 230. The optical phase modulator 220 is designed to impart a carrier modulation phase range of at least $\pi$, which is necessary for the modulation frequency signal element to have enough power to be effectively detected. It also should be noted that $f_c$ is much less than the pulse rate of the input optical signal. The phase modulated signal $P_m$ emerging from the output 222 of the optical modulator 220 has the following functional form:

$$P_m = a_o \cdot \sin(\omega t + \phi_m)$$

where the shift in phase cause by the phase modulator is $$(\phi_m = F \sin(2\pi f_c t)$$

where F is the modulation phase range. As mentioned above, $F > \pi$ in order to provide enough spectrum power around $f_c$. This phase modulated output $P_m$ traverses post phase modulator waveguide portion 245 and enters input 251 of the photodiode 250.

The output optical signal tapped by the second optical power tap 147, $P_o$, propagates along the second power tap waveguide portion 265 to the second input 253 of the photodiode 250, and is of the following functional form:

$$P_o = b_{o1}(t) \cdot \sin(\omega t + \phi_1) + b_{o2}(t) \cdot \sin(\omega t + \phi_2)$$

where $b_{o1}(t)$ is the amplitude of the amplitude modulated carrier of the optical signal which has traversed tributary A 150, where $b_{o2}(t)$ is the amplitude of the amplitude modulated carrier of the optical signal which has traversed tributary B 160, where $\phi_1$ is the phase shift introduced to the carrier along tributary A 150, and where $\phi_2$ is the phase shift introduced to the carrier along tributary A 160. The photodiode 250 detects the mean intensity of a combined optical signal which is the sum of $P_o$ and $P_m$. This mean intensity corresponds to the envelope of the combined optical signal. Since the photodiode 250 has a very low response timeconstant in comparison with the carrier frequency $\omega$, and the period of the pulses generated by the pulse generator 210, the signal detected at the photodiode, and hence the electrical combined output I from output 252 is of the following form:

$$I = 1/2 \cdot [\langle a \rangle^2 + \langle b_1 \rangle^2 + \langle b_2 \rangle^2] + \langle b_1 \cdot b_2 \rangle \cdot \cos(\varphi_1 - \varphi_2) + a \cdot \langle b_1 \rangle \cdot \cos(\varphi_m - \varphi_1) + a \cdot \langle b_2 \rangle \cdot \cos(\varphi_m - \varphi_2)$$

where <x> denotes the mean value of x, where a is an electrical amplitude corresponding to optical amplitude $a_o$, where $b_1$, is an electrical amplitude corresponding to optical amplitude $b_{o1}$, and where $b_2$ is an electrical amplitude corresponding to optical amplitude $b_{o2}$. Taking into account that on the timescale of the photodiode, only $\phi_m$ has any relevant time dependency which does not appear simply as a DC (direct current) component, the above form reduces to the following:

$$I = DC + a \cdot \langle b_1 \rangle \cdot \cos(\phi_m - \phi_1) + a \cdot \langle b_2 \rangle \cdot \cos(\phi_m - \phi_2)$$

In the general case, the average or mean value of the modulating functions $b_1(t)$ should be equal or very nearly equal. We will define b such that $$b = \langle b_1 \rangle = \langle b_2 \rangle$$

The electrical combined output I from the output 252 of the photodiode 250 is:

$$I = DC + a \cdot b \cdot [\cos(\varphi_m - \varphi_1) + \cos(\varphi_m - \varphi_2)]$$
$$= DC + 2 \cdot a \cdot b \cdot \cos[(\varphi_2 - \varphi_1)/2] \cdot \cos[\varphi_m - (\varphi_2 + \varphi_1)/2]$$

This may be interpreted as the sum of the DC component and the AC component of the envelope of the combined signals (the mean intensity) which varies as a result of the phase modulated signal coming into and going out of phase with each of the optical signals which have traversed the two tributaries. The detector output is output through output 252 over electrical line 255 to the input 261 of the phase shifter controller 260. The phase shifter controller 260 (described in more detail below) as a function of the output from the photodiode 250, sends electrical control signals from its output 262 over control line or lines 190 to the input of the carrier phase shifter 180 for control thereof. The carrier phase shifter 180 imparts a phase shift to the optical signals passing therethrough, namely optical signals traversing tributary B 160. The range of the carrier phase shifter 180 should be large enough to compensate for the worst environment caused phase difference of the two tributaries. In this way, any extreme variations in temperature which may cause larger or smaller path lengths and hence varying optical path differences should be within the range of the carrier phase shifter 180.

Figure 5:
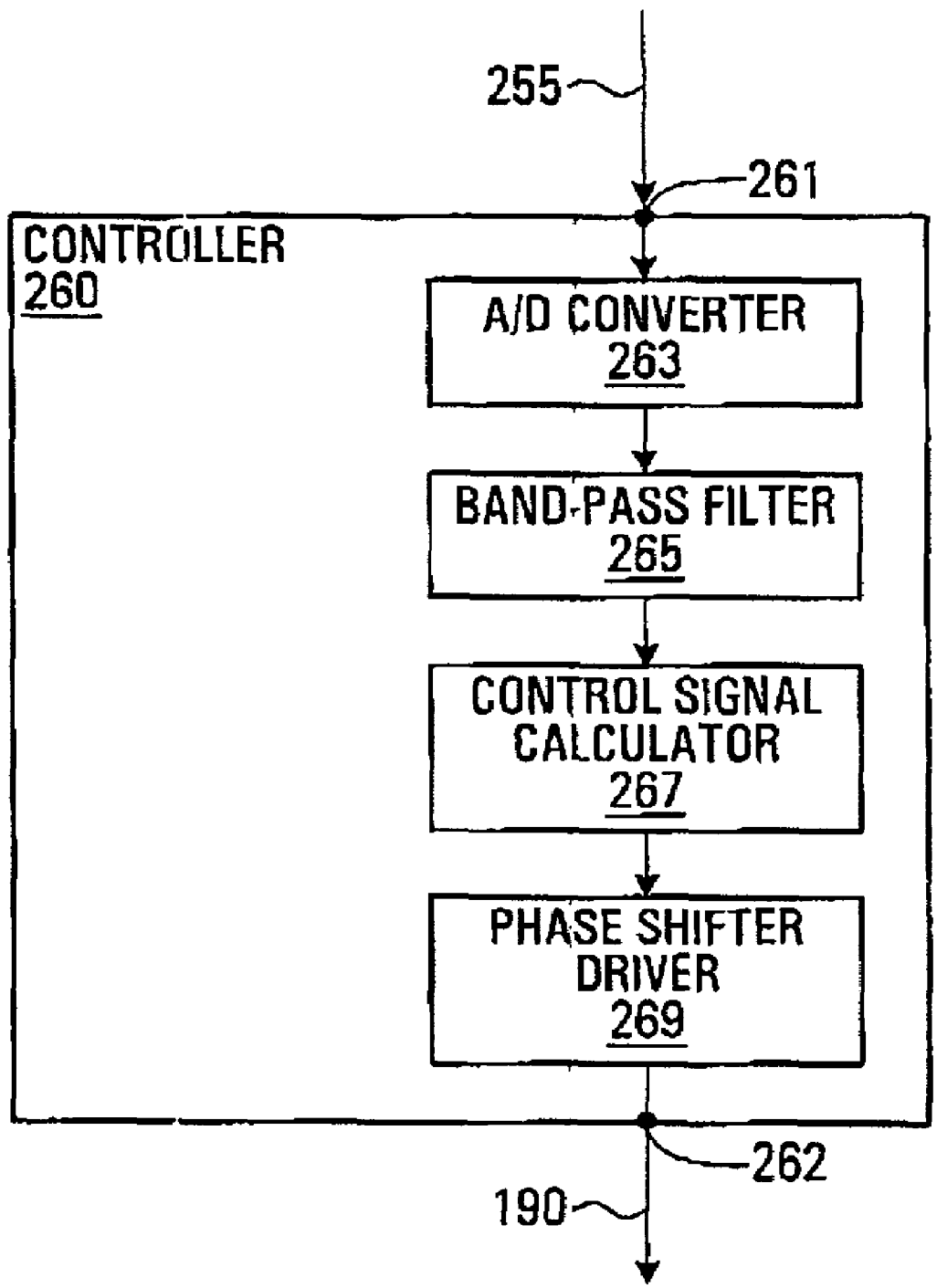
FIG. 5 is a functional block diagram of a preferred implementation of a phase shifter controller constructed according to the invention.

Referring to FIG. 5, a preferred implementation of a phase shifter controller 260 constructed according to the invention is described. Signals from the photodiode 250 enter through the input 261 of the phase shifter controller 260 and enter an A/D (analog to digital) converter 263 which converts the analog input into digital form. The A/D converter 263 outputs the digital converted signal to a band-pass filter block 265. The band-pass filter block 265 has a narrow band pass filter centered on the frequency of the optical phase modulator 220 $f_c$, and a low pass filter and will be discussed in more detail below. The output from the band-pass filter block 265 is output to a control signal calculator 267 which determines from the output from the band-pass filter block 265, what kind of adjustment needs to be made to the phase shifter 180. The phase shifter driver 269 is passed instructions from the control signal calculator 267 as to what adjustment needs to be made to the phase shifter 180. The phase shifter driver 269 sends control signals through the output 262 of the phase shifter controller 260 to control the carrier phase shifter 180 in accordance with the adjustment needed.

Figure 6A:
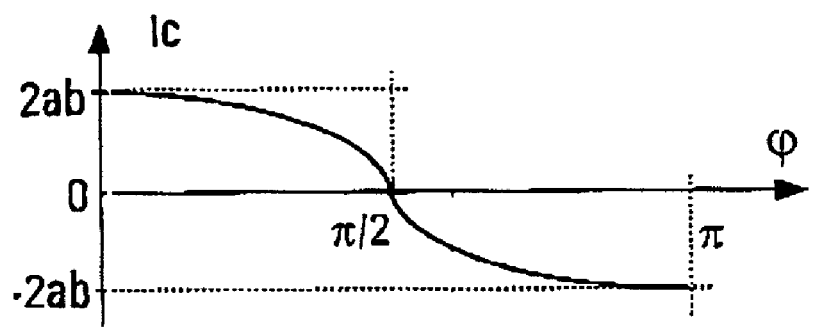
FIGS. 6A and 6B are plots respectively of band-pass filtered signal $I_c$ versus the functional angular argument $\phi$, and band-pass filtered signal $I_c$ versus the relative phase difference $\phi_2$.
Figure 6B:
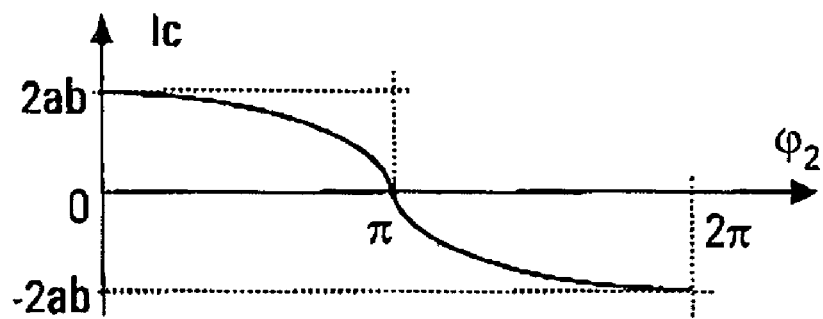

Referring now also to FIGS. 6A and 6B, the operation of the band-pass filter block 265 within the phase shifter controller 260 is described. The band-pass filter block 265 includes a sharp and narrow band-pass filter centered around $f_c$ with a bandwidth of less than $(\frac{1}{4})f_c$, and operates at the input signal sampling rate. The purpose of the narrow band-pass filter is to filter out a signal $I_c$ from the signal output from the photodiode, which corresponds to the amplitude of the AC component of the envelope of the combined optical signal which will be of the form:

$$I_c = 2 \cdot a \cdot b \cdot \cos [(\phi_2 - \phi_1)/2]$$

It should be noted that $I_c = 0$ at $\phi_2 - \phi_1 = k \cdot \pi$ where k is an odd integer. For all intents and purposes a phase difference of an odd integer number of $\pi$ is the same as a phase difference of $\pi$, and hence when $I_c = 0$, the phase difference between signals traversing the two tributaries is appropriate for carrier suppression. Substituting $\phi$ for the argument of the cosine ($\phi_2$−$\phi_2$)/2, FIG. 6A depicts a plot of $I_c$ varying as a function of the argument. The cosine of course having a zero at $\pi/2$ and this case the maximum of $I_c$ is 2·a·b. Since it is only the relative difference between $\phi_1$ and $\phi_2$ which is relevant to carrier suppression, we will take ($\phi_1$=0, and describe how $\phi_2$ (now equivalent to the relative phase difference) is varied between 0 and $2\pi$ during normal system operation. A plot of $I_c$ versus $\phi_2$ is shown in FIG. 6B. From this plot it can be seen that when $\phi_2$=$\pi$, $I_c$=0, and the OTDM module achieves carrier suppressed OTDM modulation, producing a desired CS-RZ format optical stream. When $\phi_2$=0 or $2\pi$, $I_c$ is at its maximum values, and the phase shifter controller 260 should be set to make an adjustment with a proper large step and high rate to quickly bring $\phi_2$ back to $\pi$. In the preferred embodiment the phase shifter controller 260 has its nominal operating position with ($\phi_2$ close to $\pi$. In order for the phase shifter controller 260 to have stable performance, and a stable and precise control of $\phi_2$ in the vicinity of $\pi$, the precise step size, update rate, and direction of the phase shift adjustment should be calculated. To reliably carry out this calculation, the band-pass filter block 265 further includes a low-pass filter to filter out short term noise from $I_c$. The low-pass filter has a length covering a time period which matches the major environmental parameter variation period $T_{ENV}$. The low-pass filter may be implemented as multi-stage filters with different filter lengths so that the short and long term $\phi_2$ behavior can be monitored. After low-pass filtering, $I_c$ emerges from the band-pass filter block 265 as a low-passed signal $I_{lp}$, and is used in the calculation made by the control signal calculator 267. Since plots in FIGS. 6A and 6B represent idealized versions of $I_c$, they also correspond to plots of $I_{lp}$ versus phase, and obviously $I_{lp}$ is of the form $I_{lp}$=2·a·b·cos[($\phi_2$−$\phi_1$)/2].

The control signal calculator 267 determines the step size required for an adjustment of the carrier phase shifter 180. In the preferred embodiment, associated with the control of the carrier phase shifter 180 is a control resolution $P_{rs}$ which is the smallest practical adjustment step size, and associated with the low-passed signal $I_{lp}$ is $I_{th}$ a system threshold corresponding to a chosen threshold difference between $I_{lp}$ and the target 0 within which the system will make no adjustment. It should be noted, given the cosine functional dependence, a control step direction of the adjustment always corresponds to the sign of $I_{lp}$, i.e. if $I_{lp}$ is negative the control step to adjust $\phi_2$ is negative, and if $I_{lp}$ is positive the control step to adjust $\phi_2$ is positive. The control step size $P_{ss}$(n) is measured in units of $P_{rs}$, and as will be seen below is some integer or half integer multiple thereof. For step n corresponding to a current iteration, $P_{ss}$(n) is calculated by the control signal calculator as follows: if $\{|I_{lp}(n)/2 \cdot a \cdot b| < P_{rs}\}$ or $\{|I_{lp}(n)| < I_{th}\}$ then $P_{ss}$(n)=0, otherwise, if $\{|I_{lp(n)|< Ilp}(n-1)|\}$, or if the control step direction is different from the control step direction of the previous iteration then $P_{ss}$(n)=(½)Int$\{|I_{lp}(n)|/2 \cdot a \cdot b \cdot P_{rs}\}$, otherwise $P_{ss}$(n)=Int$\{|I_{lp}(n)|/2 \cdot a \cdot b \cdot P_{rs}\}$. This control step size and direction are sent to the phase shifter driver 269. It should be noted that with the system crossing-zero work position ($\phi_2$=$\pi$) a Least-Square estimation (LMS) can be applied in the phase shifter controller 260. The phase shifter driver 269 outputs through output 262 and over control line or lines 190 to control the carrier phase shifter 180 by shifting the phase by an amount of $P_{ss} \cdot P_{rs}$. Once the phase has been adjusted by this amount the process of calculating the next step occurs. Repeatedly adjusting the phase in this manner adaptively controls the phase shifter until proper carrier suppression is achieved. It should be understood that in general other methods of controlling the phase shifter are contemplated by the invention.

Figure 7:
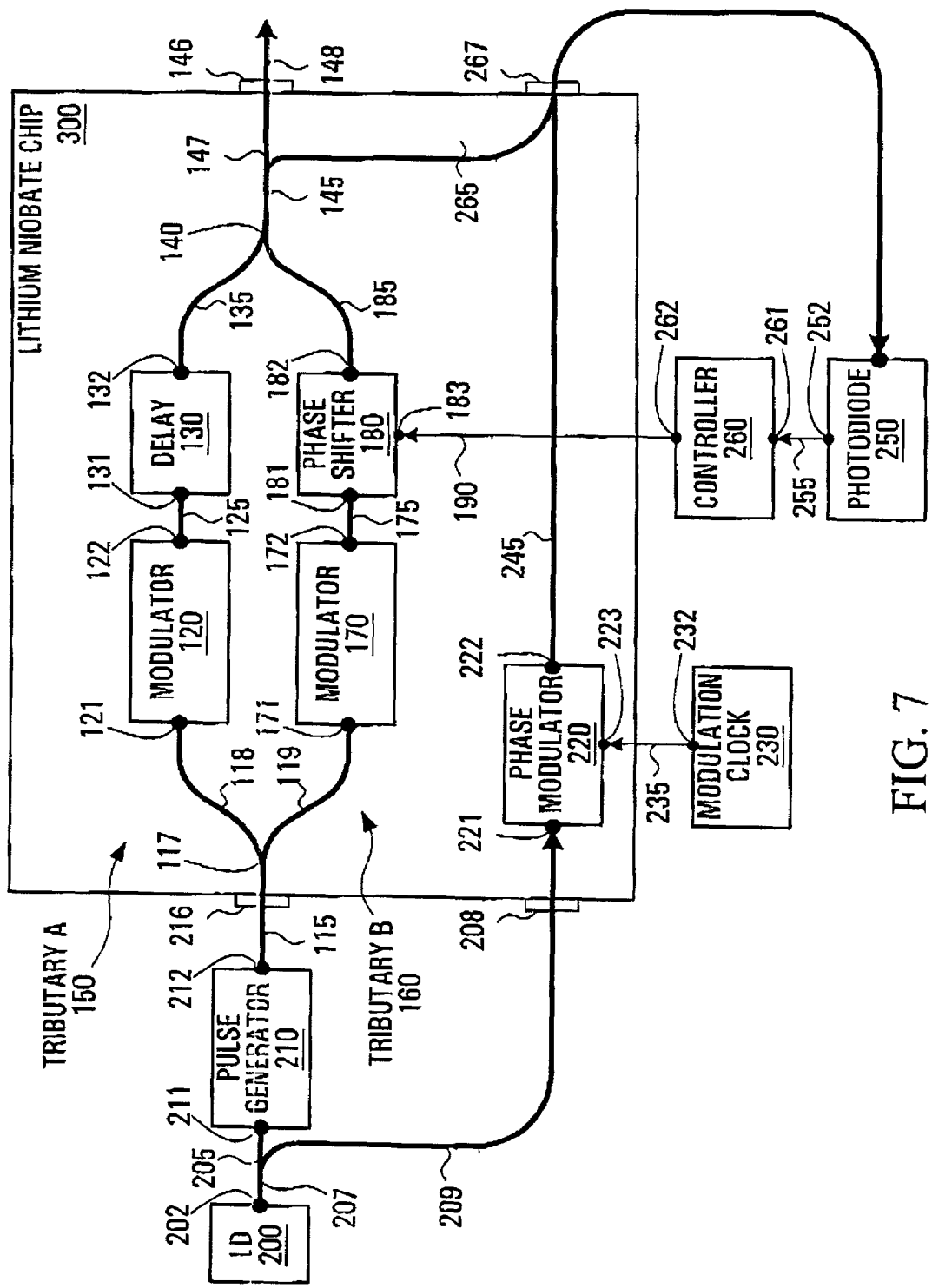
FIG. 7 is a functional block diagram of a preferred implementation of a variation of the OTDM module of FIG. 4.

Referring to FIG. 7, a preferred implementation of a variation of the OTDM module of FIG. 4 which may be partially implemented on substrate is discussed. In such a case, an external laser diode 200, and an external pulse generator 210 may input along polarization maintaining fiber (PMF) 115 to a first input fiber holder 216 of a lithium niobate (LiNbO$_3$) chip 300. The first power tap waveguide portion 209 is also implemented with PMF and is coupled to an input fiber holder 208 of the lithium niobate chip 300. All of tributary A 150 would then be implemented on the LiNbO$_3$ chip, except for an output fiber portion 148 implemented with PMF or SMF (single mode fiber which is coupled to a first output fiber holder 146 of the lithium niobate chip 300. The first optical power tap 207 may be such that it redirects 2% of the power of the optical signal along the first power tap waveguide portion 209, to enter a second input fiber holder 208 of the lithium niobate chip 300. The second optical power tap 147 may be such that it redirects 5% of the power of the optical signal along the second power tap waveguide portion 265. The upper optical modulator 120 and the lower optical modulator 170 could each be Mach-Zehnder modulators. The delay element 130 could simply be an optical path delay waveguide on the LiNbO$_3$ chip. The phase carrier phase shifter 180 could be a Lithium Niobate phase modulator or a thermal electrical controller. Phase modulator 220 which could be implemented on the substrate may be a Lithium Niobate phase modulator driven by a 100 kHz sinusoidal signal, or a piezoelectric modulator. The modulation clock 230 in this case may or may not be implemented on the substrate and is shown as an external modulation clock. The output of the phase modulator 220 and the second optical power tap 147 implemented on the substrate may be combined at combiner 266 before being output from the chip at a second output fiber holder 267 and input to an external photodiode 250 having a single input 253. The output of the photodiode 250 (which could be a PIN detector with a 1 MHz bandwidth) is input to an external phase shifter controller 260 which has a band-pass filter which is a digital electrical finite impulse response filter centered at 100 kHz with 1 kHz 3 dB bandwidth. The on chip carrier phase shifter 180 is controlled by the external phase shifter controller 260.

Although the OTDM modules of the prior art and those shown in association with the preferred embodiments have been depicted as having two tributaries, it should be understood that in general an OTDM may include any number of tributaries. The purpose of an OTDM is to combine a plurality of signals into a single time domain multiplexed optical signal. In general the number of signals combined in this way is not restricted to two, and since the number of tributaries of an OTDM module will equal the number of signals which are to be combined therein, neither is the number of tributaries restricted to two. In an alternative multi-tributary embodiment in which the OTDM module has an even number of tributaries N=2K, where N is greater than two, the phase control architecture would generally be the same as that shown in association with FIGS. 4, and 7. The first optical power tap 207, the first waveguide portion 205, the first power tap waveguide portion 209, the optical phase modulator 220, the clock line 235, the modulation clock 230, the post phase modulator waveguide portion 245, the photodiode 250, the second optical power tap 147, the second power tap waveguide portion 265, the electrical line 255, and the phase shifter controller 260, would all be present in the alternative multi-tributary embodiment. In the case of an alternative embodiment more like that shown in FIG. 7 the combiner 266 may also be present. In the multi-tributary embodiment, the optical time domain multiplexed output mace up of all of the N optical signals traverses the second power tap waveguide portion 265 to the photodiode 250. All except for one of the tributaries, that is N−1 of them, will have a respective phase shifter 180, and each phase shifter 180 will be coupled via a respective control line or lines 190 to the single phase shifter controller 260. The phase shifter controller 260 will generally be the same as that described above in association with FIGS. 4 and 5 except that there would be N−1 outputs 262 by which the phase shifter controller 260 would separately control the respective N−1 phase shifters 180. The phase shifter controller would have the same structure as described above, but would be set to operate to control the phase shifters 180 sequentially. The general approach is the same as that described in association with FIGS. 4 and 7, namely, to minimize the AC component of the envelope of the combined signal $I_{tp}$. The phase shifter controller 260 operates in the same manner as that described in association with FIG. 5, varying in turn each of the N−1 phase shifters 180 while keeping the remaining N−2 phase shifters 180 constant. The control signal calculator 267, however, does not attempt to find a zero of the AC component of the envelope of the combined signal $I_{tp}$, but instead calculates control steps until a minimum $I_{tp}$ is reached as a function of varying a particular phase shifter 180. Once a minimum is reached with a particular phase shifter 180, the phase shifter controller 260 operates to control the next phase shifter 180, Once each of the N−1 phase shifters 180 has been controlled to minimize the AC component of the envelope of the combined signal, carrier suppression will have been achieved, and the process continues to maintain carrier suppression.

It is to be understood that although reference to a tributary has been made in association with example tributaries of the preferred embodiments, within the meaning according to the invention a tributary is any path along which any one of the input signals traverses while traversing any portion of the OTDM module before being combined into the time domain multiplexed output leaving the OTDM. As such, in general a tributary need not have the same shape or form as that depicted in the figures or as described in association with the preferred embodiments.

Numerous modifications and variations of the present invention are possible in light of the above teachings. It is therefore to be understood that within the scope of the appended claims, the invention may be practiced otherwise than as specifically described herein.

We claim:

1. An apparatus for providing carrier suppression for the optical output of an optical time domain multiplexing (OTDM) module, the OTDM module operable to interleave a plurality of optical signals traversing a respective plurality of tributaries including a first tributary, the apparatus comprising:
    a carrier phase shifter for shifting a phase of a carrier of a particular optical signal traversing the first tributary of the OTDM module; and
    a feedback loop apparatus for controlling the carrier phase shifter, the feedback loop apparatus controlling a magnitude of the shifting of the phase of the carrier of the optical signal as a function of an optical input signal and an optical output signal to achieve a phase difference of π between each pulse of the interleaved optical output signal.

2. An apparatus for providing carrier suppression for the optical output of an optical time domain multiplexing (OTDM) module, the OTDM module having a tributary, the apparatus comprising:
    a carrier phase shifter for shifting the phase of a carrier of an optical signal traversing a tributary of the OTDM module;
    a feedback loop apparatus for controlling the carrier phase shifter, the feedback loop apparatus detecting a phase modulated portion of an original non-pulsed version of the carrier and a portion of the optical output, generating an electrical combined signal which corresponds to an envelope of the sum of the phase modulated portion of the original non-pulsed version of the carrier and the portion of the optical output, extracting an amplitude of an AC component of the electrical combined signal, and controlling a magnitude of said shifting of the phase of the carrier of the optical signal as a function of said amplitude to achieve a phase difference of π between successive pulses of the optical output.

3. An apparatus according to claim 2 wherein the feedback loop comprises:
    a first optical power tap for tapping an original non-pulsed version of the carrier generating the portion of an original non-pulsed version of the carrier;
    a phase modulator for modulating a phase of the portion of the original non-pulsed version of the carrier at a frequency $f_c$ generating a phase modulated portion of the original non-pulsed version of the carrier;
    a second optical power tap for tapping the optical output, generating the portion of the optical output;
    a detector for detecting the phase modulated portion of the original non-pulsed version of the carrier and the portion of the optical output, generating an electrical combined signal, said electrical combined signal being a mean intensity of a sum of the phase modulated portion of the original non-pulsed version of the carrier and the portion of the optical output; and
    a phase shifter controller for extracting the amplitude of the AC component of the electrical combined signal, and controlling the magnitude of said shifting of the phase of the carrier of the optical signal as a function of said amplitude.

4. An apparatus according to claim 3 wherein the phase shifter controller comprises:
    a band-pass block having a band-pass filter centered at frequency $f_c$ for extracting the amplitude of the AC component of the electrical combined signal; and
    a control signal calculator for generating from the amplitude a control step size at an update rate for use in controlling the magnitude of said shifting of the phase of the carrier of the optical signal.

5. An apparatus according to claim 4 wherein the phase shifter controller further comprises:
    an A/D converter for converting the electrical combined signal from the detector into a digital signal for use by the band-pass block; and
    a phase shifter driver for controlling the magnitude of said shifting of the phase of the carrier of the optical signal at the update rate as a function of the control step size generated by the control signal calculator;
wherein the band-pass block includes a low-pass filter for filtering out short term noise from the electrical combined signal.

6. An apparatus according to claim 5 further comprising a modulation clock for clocking the phase modulator with a sinusoidal clock signal, wherein the phase modulator modulates the phase of the portion of the original non-pulsed version of the carrier sinusoidally with a modulation phase range of at least π.

7. An apparatus according to claim 6 wherein the detector is a photodiode.

8. An apparatus according to claim 7 wherein the amplitude of the AC component of the electrical combined signal varies as a sinusoidal function of the phase of the carrier of the optical signal, the sinusoidal function having a maximum, wherein the control signal calculator generates the control step size from the amplitude of the AC component of the electrical combined signal according to the following:
  if the absolute value of the amplitude is less than a threshold amplitude or if the absolute value of the amplitude divided by the maximum is less than a control resolution, the control step size is zero;
  otherwise if the absolute value of the amplitude divided by the maximum is less than the absolute value of a previous amplitude divided by the maximum or if the sign of the amplitude is different from the sign of the previous amplitude, the control step size is one half the amplitude divided by the product of the maximum and the control resolution; and
  otherwise the control step size is the amplitude divided by the product of the maximum and the control resolution;
wherein the phase shifter driver determines that the magnitude of said shifting of the phase of the carrier of the optical signal is equal to the product of the control step size and the control resolution.

9. An apparatus according to claim 7 wherein the band-pass filter block comprises a plurality of low-pass filters for multi-length low-pass filtering.

10. An apparatus according to claim 6 wherein the detector comprises:
  an optical combiner for combining the phase modulated portion of the original non-pulsed version of the carrier and the portion of the optical output, generating a combined optical signal; and
  a photodiode for detecting the phase modulated portion of the original non-pulsed version of the carrier and the portion of the optical output of the combined optical signal, and for generating the electrical combined signal.

11. An apparatus according to claim 10 wherein the OTDM module is implemented on a Lithium Niobate chip wherein the first optical power tap is a 2% external power tap, the second optical power tap is a 5% on chip power tap, the carrier phase shifter is an on chip Lithium Niobate phase modulator, the phase modulator is an on chip Lithium Niobate phase modulator, the optical combiner is an on chip combiner, the photodiode is an external PIN detector, the phase shifter controller is an external controller, and the band-pass filter is a digital electrical finite impulse response filter.

12. A method of providing carrier suppression for an optical output of an optical time domain multiplexing (OTDM) module, the OTDM operable to interleave a plurality of optical signals, the OTDM module having a tributary, the method comprising:
  shifting the phase of a carrier of a particular optical signal traversing the tributary of the OTDM module; and
  controlling a magnitude of the shifting of the phase of the carrier of the optical signal as a function of an optical input signal and an optical output signal to achieve a phase difference of π between each pulse of the optical output signal.

13. A method of providing carrier suppression for the optical output of an optical time domain multiplexing (OTDM) module, the OTDM module having a tributary, the method comprising:
  shifting the phase of a carrier of an optical signal traversing the tributary of the OTDM module;
  detecting a phase modulated portion of an original non-pulsed version of the carrier and a portion of the optical output;
  generating an electrical combined signal which corresponds to an envelope of the sum of the phase modulated portion of the original non-pulsed version of the carrier and the portion of the optical output;
  extracting an amplitude of an AC component of the electrical combined signal; and
  controlling a magnitude of said shifting of the phase of the carrier of the optical signal as a function of said amplitude to achieve a phase difference of π between successive pulses of the optical output.

14. A method according to claim 13 further comprising:
  tapping an original non-pulsed version of the carrier generating the portion of an original non-pulsed version of the carrier;
  modulating a phase of the portion of the original non-pulsed version of the carrier at a frequency $f_c$ generating a phase modulated portion of the original non-pulsed version of the carrier; and
  tapping a portion of the optical output generating the portion of the optical output; wherein said electrical combined signal is a mean intensity of a sum of the phase modulated portion of the original non-pulsed version of the carrier and the portion of the optical output.

15. A method according to claim 14 wherein said extracting the amplitude of the AC component of the electrical combined signal comprises band-pass filtering centered at frequency $f_c$, and wherein said controlling the magnitude of said shifting of the phase of the carrier of the optical signal further comprises generating from the amplitude a control step size at an update rate.

16. A method according to the claim 15 wherein said extracting the amplitude of the AC component of the electrical combined signal further comprises:
  converting the electrical combined signal into a digital signal for use in band-pass filtering;
  low-pass filtering for filtering out short term noise from the electrical combined signal; and
  controlling the magnitude of said shifting of the phase of the carrier of the optical signal at the update rate as a function of the control step size.

17. A method according to claim 16 further comprising controlling the modulating of a phase of the portion of the original non-pulsed version of the carrier by clocking with a sinusoidal clock signal, wherein the modulating of a phase of the portion of the original non-pulsed version of the carrier modulates the phase of the portion of the original non-pulsed version of the carrier sinusoidally with the modulation phase range of at least π.

18. A method according to claim 17 further comprising:
  combining the phase modulated portion of the original non-pulsed version of the carrier and the portion of the optical output, generating a combined optical signal; and
  detecting the phase modulated portion of the original non-pulsed version of the carrier and the portion of the optical output of the combined optical signal.

19. A method according to claim 18 wherein the OTDM module is implemented on a Lithium Niobate chip, wherein the tapping of an original non-pulsed version of the carrier is external 2% power tapping, the tapping of the optical output is on chip 5% power tapping, the shifting of the phase of the carrier of the optical signal is on chip Lithium Niobate phase shifting, the modulating of the phase of the portion of the original non-pulsed version of the carrier is on chip Lithium Niobate phase modulating, the combining of the phase modulated portion of the original non-pulsed version of the carrier and the portion of the optical output is on chip combining, the controlling of the magnitude of said shifting of the phase of the carrier of the optical signal as a function of said amplitude is performed externally.

20. A method according to claim 17 wherein the amplitude of the AC component of the electrical combined signal varies as a sinusoidal function of the phase of the carrier of the optical signal, the sinusoidal function having a maximum, wherein generating from the amplitude a control step size at an update rate comprises:

if the absolute value of the amplitude is less than a threshold amplitude or if the absolute value of the amplitude divided by the maximum is less than a control resolution, the control step size is zero;

otherwise if the absolute value of the amplitude divided by the maximum is less than the absolute value of a previous amplitude divided by the maximum or if the sign of the amplitude is different from the sign of the previous amplitude, the control step size is one half the amplitude divided by the product of the maximum and the control resolution; and otherwise, the control step size is the amplitude divided by the product of the maximum and the control resolution;

wherein the magnitude of said shifting of the phase of the carrier of the optical signal is determined to be equal to the product of the control step size and the control resolution.

21. A method according to claim 17 wherein low-pass filtering comprises multi-length low-pass filtering.

22. An optical time domain multiplexing (OTDM) module providing carrier suppression for an interleaved optical output of the OTDM module, the OTDM module having a plurality of tributaries including a first tributary, the OTDM module comprising:

a carrier phase shifter for shifting the phase of a carrier of an optical signal traversing the first tributary of the OTDM module; and a feedback loop apparatus for controlling the carrier phase shifter, the feedback loop apparatus controlling a magnitude of the shifting of the phase of the carrier of the optical signal as a function of an input carrier signal and an optical output to achieve a phase difference of $\pi$ between each pulse of the interleaved optical output.

23. An optical time domain multiplexing (OTDM) module providing carrier suppression for the optical output of the OTDM module, the OTDM module having a tributary, the OTDM module comprising:

a carrier phase shifter for shifting the phase of a carrier of an optical signal traversing a tributary of the OTDM module; and a feedback loop apparatus for controlling the carrier phase shifter, the feedback loop apparatus detecting a phase modulated portion of an original non-pulsed version of the carrier and a portion of the optical output, generating an electrical combined signal which corresponds to an envelope of the sum of the phase modulated portion of the original non-pulsed version of the carrier and the portion of the optical output, extracting an amplitude of an AC component of the electrical combined signal, and controlling a magnitude of said shifting of the phase of the carrier of the optical signal as a function of said amplitude to achieve a phase difference of $\pi$ between successive pulses of the optical output.

24. A method of providing carrier suppression for the optical output of an optical time domain multiplexing (OTDM) module, the OTDM module having N tributaries, the method comprising:

for N−1 tributaries of the OTDM module, shifting the phases of the carriers of optical signals traversing the N−1 tributaries;

detecting a phase modulated portion of an original non-pulsed version of the carrier and a portion of the optical output;

generating an electrical combined signal which corresponds to an envelope of the sum of the phase modulated portion of the original non-pulsed version of the carrier and the portion of the optical output;

extracting an amplitude of an AC component of the electrical combined signal; and controlling magnitudes of said shifting of the phases of the carriers of optical signals traversing the N−1 tributaries as a function of said amplitude to achieve a phase difference of $\pi$ between successive pulses of the optical output.

* * * * *

UNITED STATES PATENT AND TRADEMARK OFFICE
CERTIFICATE OF CORRECTION

PATENT NO.         : 7,574,139 B2
APPLICATION NO. : 10/157900
DATED              : August 11, 2009
INVENTOR(S)        : Xiaoli Fu et al.

It is certified that error appears in the above-identified patent and that said Letters Patent is hereby corrected as shown below:

Column 17, Line 60 at Claim 12; replace:
"phase difference of it between each pulse of the optical" with
-- phase difference of $\pi$ between each pulse of the optical --

Column 18, Line 50 at Claim 17; replace:
"version of the carrier sinusoidally with the modulation phase" with
-- version of a carrier sinusoidally with a modulation phase --

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,574,139 B2 | Page 1 of 1 |
| APPLICATION NO. | : 10/157900 | |
| DATED | : August 11, 2009 | |
| INVENTOR(S) | : Xiaoli Fu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,587 days.

Signed and Sealed this
Fourth Day of January, 2011

David J. Kappos
*Director of the United States Patent and Trademark Office*